United States Patent Office 3,606,502
Patented Sept. 20, 1971

3,606,502
ANTIFRICTION BEARING ASSEMBLY
Hubert de Germond, Villa "Les Presles," Menthon-Saint-Bernard, Haute-Savoie, France
Filed Aug. 25, 1969, Ser. No. 852,611
Claims priority, application France, Aug. 30, 1968, 50,345
Int. Cl. F16c 13/06
U.S. Cl. 308—196                    7 Claims

ABSTRACT OF THE DISCLOSURE

A ball bearing assembly in which the outer race of the bearing assembly is constituted by two outer annular, metallic cheeks. The plastics material is injected onto the two cheeks which are mounted on the ball bearings inside a mould. The two cheeks are not connected rigidly to each other so that the pressure exerted by the plastics material being injected ensures that the cheeks in contact with the ball bearings are correctly centered.

---

This invention relates to the manufacture of pulleys, wheels and other similar rotating members mounted on bearings.

It has already been proposed to mould a part in plastics material on the outer race of a ball bearing. In such a construction there must be used a complete ball bearing, i.e. a relatively heavy, bulky and expensive part.

It has also been proposed to manufacture the outer race of a bearing by means of two sheet-iron cheeks suitably fastened to each other and held in place inside a hub of plastics material. There is thus avoided the use of a completely mounted bearing, but the difficulty arises of centering the cheeks on the balls or other rolling members very accurately in order to avoid inadmissible play.

It is an object of the present invention to obviate or mitigate the aforesaid disadvantages.

According to the present invention there is provided a method of manufacturing pulleys, wheels and other similar rotating members in plastics material moulded on a bearing in which the outer race of the bearing is constituted by two outer annular, metallic cheeks appropriately shaped in radial section, comprising the step of injecting plastics material onto the assembly of the two cheeks which are mounted on the rolling members of the bearing inside a mould, but which are not connected rigidly to each other so that the pressure of the material ensures centering of these cheeks in contact with the rolling members.

In a preferred embodiment, the inner race of the bearing is established by means of two cheeks, like the outer race, by injecting a ring of plastics material inside the assembly of these two cheeks in such a manner as to centre them relative to the rolling members.

The outer cheeks may have lateral extensions forming deflectors for sealing the rolling members from the outside atmosphere in known manner. The bearings may have two rows of rolling members, and if desired these rolling members may be constituted not only by balls, but also by conical rollers, if preferred.

The hub moulded on the assembly of the two outer cheeks is preferably integral with the rotating member. In other words, the injection mould is provided for moulding a single part, for example, a pulley and its hub.

Embodiments of the present invention will now be described, by way of example, with reference to the accompanying drawings, in which.

Figure 1:
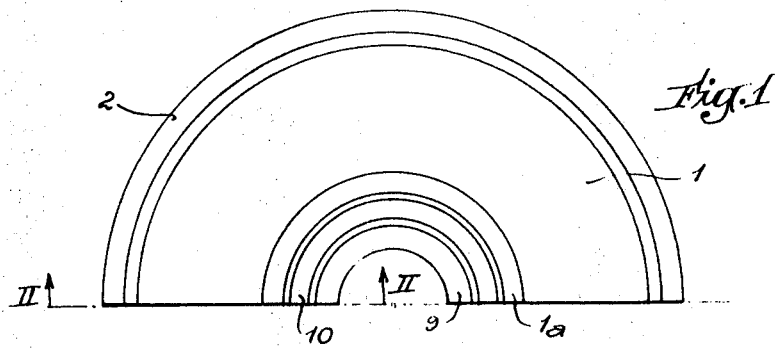
FIG. 1 is a fragmentary elevation of a pulley with a ball bearing constructed according to the invention.
Figure 2:
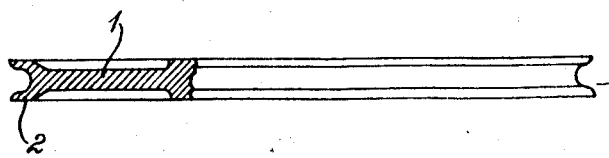
FIG. 2 is a corresponding plan with a radial section on the line II—II of FIG. 1.

In FIGS. 1 and 2 the reference 1 indicates the central web of a pulley intended to be mounted on a loom in order to ensure the return of the healds of the shafts. The outer, peripheral edge of this web 1 is integral with a rim 2 of grooved type while its lower edge is joined to a central hub intended to be rotatably mounted on a fixed shaft. The assembly is produced in plastics material.

Figure 3:
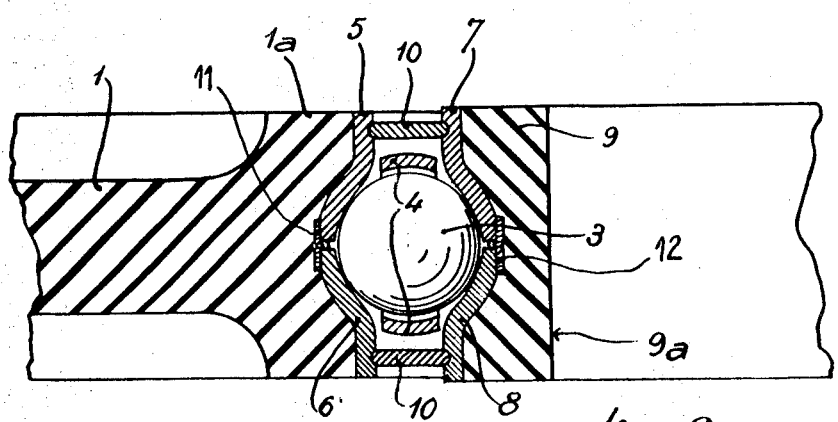
FIG. 3 is a radial section to an enlarged scale, showing a detail of the ball bearing.

As shown in FIG. 3, the central hub 1a of the pulley is supported on a row of balls 3 held in place inside a cage 4. The outer race which co-operates with the balls 3 is constituted by two annular sheet-iron cheeks 5 and 6 arranged respectively on both sides of the radial plane defined by the centres of the balls 3. Each cheek comprises in radial section a first incurved part defining a concave face suitable for bearing on the balls 3, then an extension parallel to the shaft of the pulley. Similarly, the inner race on which the balls 3 roll is constituted by an assembly of two annular, metallic cheeks 7 and 8 shaped and arranged like the cheeks 5 and 6, these cheeks 7 and 8 being supported internally by a ring of plastics material 9, the axial bore 9a of which is adapted to be mounted on the support shaft, which is not shown.

It can be seen in FIG. 3 that the assembly of the cheeks 5, 6, 7 and 8 is symmetrical in relation to the centre of the ball 3 shown.

The air-tightness of the bearing constituted by the cheeks 5 to 8 and by the balls 3 is ensured by lateral members 10 having the shape of flat rings engaged in grooves provided in the opposed surfaces of the cheeks 5, 7 or 6, 8 respectively.

In order to produce the ball bearing of FIG. 3 there is mounted in an appropriate mould, the assembly of balls, the cheeks 5 to 8 and the members 10. An adhesive ribbon 11 is provided to cover the joint between the cheeks 5 and 6 and another 12 for similarly covering the joint between the checks 7 and 8. Plastics material is injected into the mould for producing, on the one hand, the pulley 1, 2 with its hub 1a and, on the other hand, the central ring 9. The ribbons 11 and 12 prevent the plastics material from infiltrating between the cheeks. On the other hand, the pressure of this material presses the cheeks against the balls, in such a manner that after the withdrawal of patterns there is obtained a perfect ball bearing, with no appreciable play.

Naturally, the mould must be equipped with the necessary means for holding the cheeks in place during the injection.

In a modification, the cheeks 5 and 6, the balls 3 and the cage 4 can be mounted on a core inside a mould and the injection moulding of the pulley 1, 2 and of its hub 1a is carried out, the cheeks 5, 6 being pressed against and centered on the balls held by the core. The core is then removed, the cheeks 7, 8 are mounted in the mould and the interior ring 9 is then moulded, the inner cheeks 7, 8 pressing against and centering themselves against the balls 3 held in place by the outer cheeks 5, 6. Finally two separate moulds are provided for carrying out the two above said moulding operations.

Figure 4:
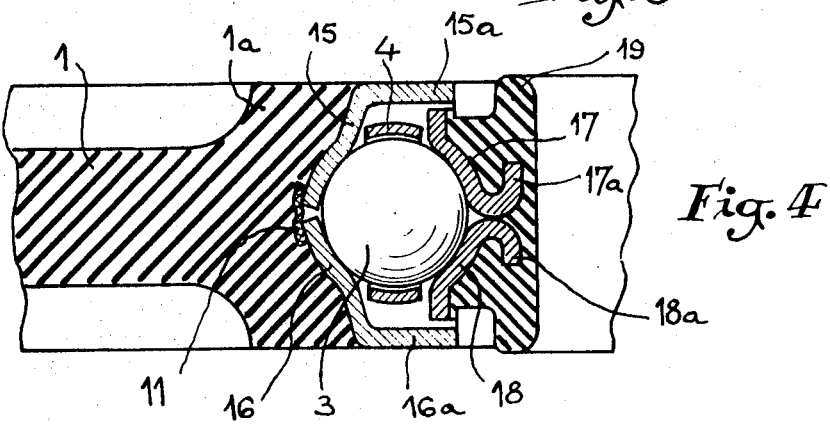
FIG. 4 is a view similar to that of FIG. 3 but of a modification.

In the modified pulley of FIG. 4 the outer edge of each of the outer cheeks 15 and 16 is integral respectively with an extension 15a, 16a oriented radially in the direction of the shaft, these extensions 15a and 16a replacing the members 10 of FIG. 3. Each of the inner cheeks 17 and 18 terminates respectively at its inner end (i.e. that opposite the opposing cheek) in a part 17a and 18a bent back in the form of a hook. The rounded ends of the two hooks 17a and 18a are in direct contact so that the ribbon 12 of FIG. 3 can be dispensed with, the injection pressure of the plastics material keeping them pressed one against the other with an adequate pressure for avoiding seepage of this material in the direction of the balls 3. Moreover, the hook shape produces a perfect anchorage in the body of the inner ring 19.

The mould intended for moulding the assembly shown in FIG. 4 is arranged in such a manner as to press the extensions 15a and 16a against the outer ends of the cheeks 17 and 18 in order to prevent the injected material from penetrating the space reserved for the balls. The cheeks 15 and 16 are made sufficiently resilient to allow this slight deformation inside the mould and after the removal of the mould to return themselves to the position shown in FIG. 4.

Figure 5:
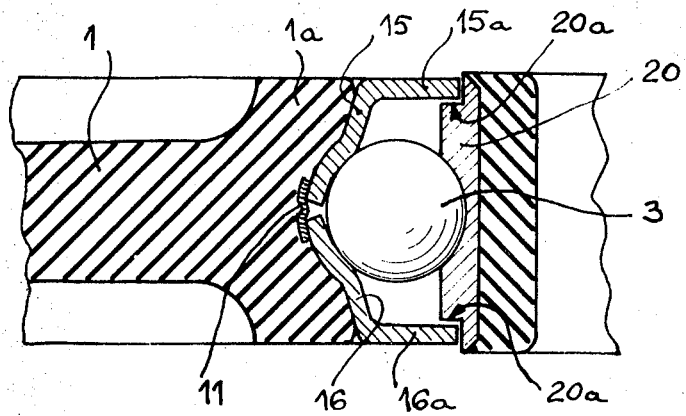
FIG. 5 is a view similar to FIG. 3 of another modification in which the inner race of the bearing is of one-piece construction.

The modification of FIG. 5 is distinguished from the embodiment of FIG. 4 by the fact that the inner race on which the balls 3 roll is constituted by a single member 20, as in a normal bearing. This race comprises at each of its sides a part of reduced outer diameter defining a shoulder 20a against which the extension or deflectors 15a or 16a abut during the moulding, as is shown in FIG. 4.

Figure 6:
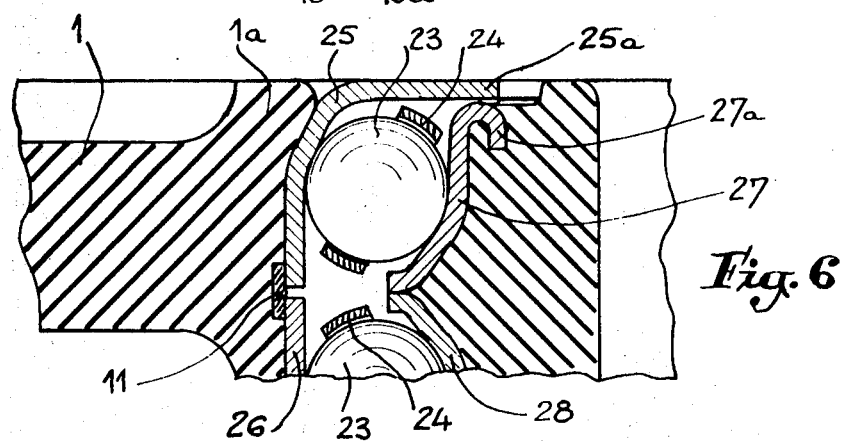
FIG. 6 is a fragmentary sectional view of an embodiment with two rows of balls.

In the embodiment of FIG. 6, the bearing has two rows of balls 23, each row being equipped with a cage 24. The outer race is constituted by two cheeks 25 and 26 suitably shaped for pressing against the balls 23, each cheek being integral with an extension or deflector such as 25a. The inner race also comprises two cheeks 27 and 28 shaped in such a manner as to form a support for the balls. As shown the inner ends of the cheeks 27 and 28 are bent round in such a manner as to be directed radially opposite the shaft and they are in close contact with one another, whereas the outer ends are folded back in the shape of a hook as shown for example at 27a. Here too, the mould is arranged to press the extensions or deflectors such as 25a against the outer, bent ends of the inner cheeks 27 and 28, which at the same time keeps the inner ends of the cheeks pressed against each other with sufficient pressure to prevent the penetration of the injected material.

Figure 7:
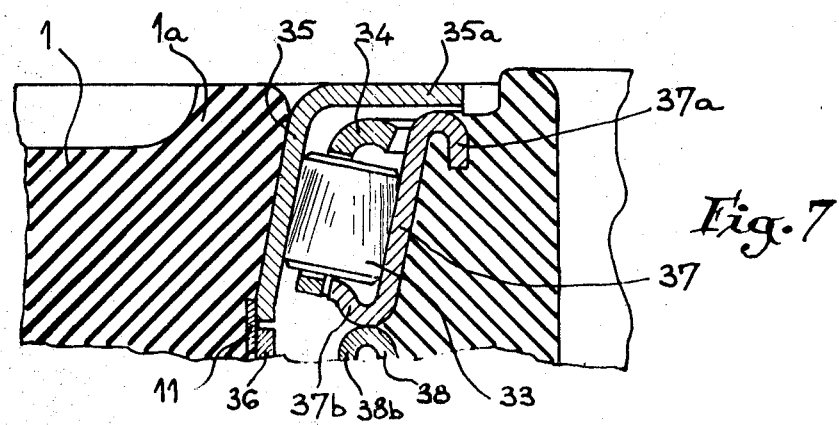
FIG. 7 is another fragmentary sectional view showing a bearing according to the invention in which the rolling members are constituted by tapered rollers.

Finally, FIG. 7 shows a variation in which the rolling members are not constituted by balls, but by tapered rollers such as 33. There are provided two rows of these rollers (only one being shown in FIG. 7), each having its own cage 34. The outer cheeks such as 35 have an inclined disposition in order to press uniformly against the rollers 33. Each of them is integral with an extension such as 35a which forms a deflector. The inner cheeks such as 37 are also inclined so as to form a track for the rollers 33. Each has an outer end bent back in the shape of a hook, such as 37a, in the manner shown for the inner cheeks in FIG. 6. Here, however, the inner ends of the cheeks 37 and 38 are also bent back as hooks, as shown at 37b and 38b, the peripheries of these hooks being kept in contact during the moulding in order to prevent any peentration of plastics material.

I claim:

1. An antifriction bearing having rolling elements and inner and outer races to rotatably support a rotatable member when mounted upon a fixed member, comprising at least one row of rolling elements movable in contact with the inner race and adapted to be carried by the fixed member and the outer race carried by the rotatable member; said inner race and said outer race each comprising two independent metallic cheeks maintained in position by two independent rings of synthetic material which contact the outer surfaces of said cheeks and which rings are injection molded simultaneously in such manner that each of the two independent cheeks become self-centered with respect to the rolling elements during and after said injection molding.

2. In an antifriction bearing as set forth in claim 1, the cheeks of the inner race having their adjacent edges in contact.

3. In an antifriction bearing as set forth in claim 1, one of the edges of the cheeks of the inner race being bent back to hook-shape for ensuring its embedding in the rotated synthetic ring.

4. In an antifriction bearing as set forth in claim 1, the outer edge of each cheek of the outer race having an extension directed radially inwardly towards the fixed member for forming a deflector.

5. In an antifriction bearing as set forth in claim 1, the said rolling elements being formed of one row of balls.

6. In an antifriction bearing as set forth in claim 1, the said rolling elements being formed of two rows of balls.

7. In an antifriction bearing as set forth in claim 1, said rolling elements being formed of two rows of tapered bearings.

References Cited

UNITED STATES PATENTS

| 2,201,477 | 5/1940 | Chamberlin | 308—196 |
| 2,266,042 | 12/1941 | Hufferd et al. | 308—196 |

FOREIGN PATENTS

| 755,123 | 8/1956 | Great Britain | 301—5.7 |

MARTIN P. SCHWADRON, Primary Examiner

F. SUSKO, Assistant Examiner